United States Patent [19]

Hauptkorn

[11] Patent Number: 5,152,354

[45] Date of Patent: Oct. 6, 1992

[54] WEIGH FEEDING APPARATUS FOR POURABLE SUBSTANCES

[75] Inventor: Alfred Hauptkorn, Rheinberg, Fed. Rep. of Germany

[73] Assignee: Brabender Technologie KG, Duisburg, Fed. Rep. of Germany

[21] Appl. No.: 458,714

[22] PCT Filed: Oct. 30, 1989

[86] PCT No.: PCT/EP89/01301

§ 371 Date: Feb. 7, 1990

§ 102(e) Date: Feb. 7, 1990

[87] PCT Pub. No.: WO91/06835

PCT Pub. Date: May 16, 1991

[51] Int. Cl.⁵ .................... G01G 19/52; G01G 23/10; B67D 5/08
[52] U.S. Cl. ..................... 177/50; 177/185; 222/56; 222/58
[58] Field of Search ................. 177/50, 185

[56] References Cited

U.S. PATENT DOCUMENTS

| 3,670,833 | 6/1972 | Tomohiko et al. | 177/185 X |
| 4,619,336 | 10/1986 | Boyer et al. | 177/50 X |
| 4,775,949 | 10/1988 | Kalata | 177/59 |

FOREIGN PATENT DOCUMENTS

| 2658252 | 11/1977 | Fed. Rep. of Germany. |
| 2754527 | 6/1978 | Fed. Rep. of Germany. |
| 2900863 | 4/1979 | Fed. Rep. of Germany. |
| 2544492 | of 0000 | France. |
| 2017971A | 10/1979 | United Kingdom. |
| 2198555 | 6/1988 | United Kingdom. |
| 2198555A | 6/1988 | United Kingdom. |

Primary Examiner—George H. Miller, Jr.
Attorney, Agent, or Firm—Townsend and Townsend

[57] ABSTRACT

A weigh feeding apparatus for pourable substances such as granulates, powders and fluids consisting of a container equipped with a controllable device for discharging the substance, weighing apparatus for the container or for a conveyor arranged subsequently to the discharging device. Attached to this is an electronic circuitry provided with a computer for the regulation and control of the discharging device, which counts the digital measuring signals of the weighing apparatus during a period of time, compares them with a reference value and produces a setting or control value for the discharging device at a divergence of the signal. In order to maintain a gravimetric feed during external disturbances and/or when refilling the container the circuitry contains a device for the production and processing of a support value, this device storing the measuring signals of the weighing apparatus at one or several feed speeds of the discharging device during an adjusting operation free of external disturbances, converting them to the setting range with the aid of the reference value, adding the supporting values to the measuring values produced during the operation during the occurrance of extremely high measuring signals or temporarily by an impulse generator. Furthermore the circuitry compares the mixed values with the reference value and produces the control or setting values for the discharging device at a divergence of same.

10 Claims, 3 Drawing Sheets

WEIGH FEEDING APPARATUS FOR POURABLE SUBSTANCES

BACKGROUND OF THE INVENTION

This invention relates to a weigh feeding apparatus for pourable substances such as granulates, powders and fluids. It consists of a container equipped with a controllable device for discharging the substance, apparatus for weighing the container or a conveyor arranged subsequently to the discharging device as well as an electronic circuitry supplied with a computer for regulating and controlling the discharging device; this circuitry counts the digital measuring signals of the weighing apparatus during a period of time, compares them with a reference signal and forms a control value for the discharging device at a divergence of the signal.

There are loss-in-weight feeders used for the feeding of pourable substances on which the speed of the weigh feeder is controlled by comparing an actual value determined by weighing with a reference value. The determination of the actual value may be effected either by using the loss of weight during the discharge of a container filled with the substances or by determining the weight of a conveyor loaded with the substance. In order to achieve a good controlling accuracy it is necessary to have the controlling action at a very small deviation of the measuring signals. Unfortunately there are sometimes caused considerable disturbances due to vibrations, shocks etc by external forces acting on the weighing apparatus which could cause serious errors in the weigh feeding process.

Besides an analog processing of the measuring signals it is also possible to process them in a digital manner. In this way a digital signal proportional to the weight is produced. This can either be done by converting an analog signal into a digital signal or by using a digital weighing apparatus in which the frequency changes are measured. In the device known from DE-OS 2754527 the measuring signals and pulse signals are stored by means of gate circuits. The number of the measuring signals stored during a predetermined time period is compared with a preset number.

To monitor the controlling action the slope angle of the measuring phases is determined and then compared with the slope angles determined before. If on comparison more than a fixed number of measuring points fall off the discharging device will continue with the speed already determined and stored. Control is therefore blocked. Only if the deviations of successive measuring periods of the following measurements are within the predetermined limits control is activated again. In order to eliminate external disturbances and influences a correction factor is determined in the configuration known from DE-OS 2754527 during an operation phase when the substance is held back on the weighing device. Oscillations of the feeder drive are determined and then stored in the computer as digitized values. These will then be deducted from the measuring signals determined at the same time. When using the optional volumetric mode the controlling circuit is also interrupted and the gating values stored before for the adjustment of the weigh feeding apparatus are utilized. To ensure that the weighing and feeding will continue when filling the container of the weigh device operation during the filling is switched from the controlled gravimetric mode to the volumetric mode which is only adjustable.

In the weigh feeding devices known there is the disadvantage that the sensitivity of response cannot be adjusted sufficiently precisely due to the disturbances to be considered. Any elimination of disturbances affects the measuring accuracy as a rule. Furthermore another disadvantage is that on any interference due to vibration, shock etc. on the weighing device the controlling circuit is interrupted and is then continued as a fixed value so that a volumetric feeding mode is used which, however, does not permit an exact weigh feeding action.

SUMMARY OF THE INVENTION

The object of the present invention is to form a weigh feeding apparatus of the specified kind in such a way that gravimetric feeding may be maintained even with external disturbances and/or on refilling of the container to be discharged: at all operating conditions.

In accordance with the invention the said circuitry is provided with a device for the formation and procession of a support value, prior to the operation of the weigh feeder stores the measuring signals of the weighing apparatus in a setting operation free of external disturbances at one or several conveying speeds of the discharging device, converts these signals to the setting range, adds the support values to the measuring signals produced at the operation during the occurrence of extremely high measuring signals or temporarily by means of an impulse generator and compares the mixed values with the reference value and produces the setting or control values for the discharging device at a divergence of the signal.

As an advantage a supporting value is formed in accordance with the invention which is produced prior to any normal service conditions in an adjusting run and which keeps external disturbances, such as shocks, vibrations etc. away from the weighing feeding device, but still keeps the other operational conditions so that the container filled with the substance is discharged. These supporting values are therefore measuring values which are formed at idealized operational conditions, so to speak. Adjusting may be carried through at any place free of disturbances.

The supporting values gained at adjustment are stored and may be added to the measuring values gained in the actual operational mode of the weigh feeder at the site as support, whereby the added value or blended value is a differentiated value the supporting portion of which tends to promote a formation of a mean value and by comparison to the reference value forms the controlling size. If during the measuring action extremely high measuring signals are encountered the added supporting values will have an attenuating effect. As an advantage, however, the controlling circuit remains and gravimetric feeding continues. The actual measuring signals will continue to be fed into the controlling circuit.

The biending ratio may be adjusted at random by feeding the measuring signals determined and the supporting values into a slide register at a ratio either set on the impulse generator or controlled. If an essentially disturbance-free operation is possible no support values at all need to be added so that the normal controlling mode is carried out. If a specific and relatively uniform basic disturbance is encountered the support value portion may be selected large enough to result in an adequate mean value which will provide for a constant feed. If, however, irregular, large disturbances occur, the support value portion may be set higher by regulation. The measuring signals determined in operation should be appropriately fed via a filter the frequency range of which should be fixed or be dynamically controlled by the support values. The frequency range should be attuned to the required sensitivity.

In order to enlarge the applicability range and to keep very brief disturbances away from the feeding operation this invention provides for a further development in which the circuitry is equipped with a device for the formation and procession of a compensating factor which stores the measuring cycles determined in operation and then produces a corrective value by comparing these cycles with the reference value. This corrective value is then added to the controlling value by means of an additional step. The compensating factor is formed by the actual measuring signals and belongs to the controlling circuit whereby the processing will lead to a certain attenuation, however. This Channel will lead to a longterm correction. The additional ratio of blended value and compensating factor may be set at random so that gravimetric feeding may be carried out by only using the compensating factor as controlling value. Alternatively the compensating factor may be used for controlling purposes. For this purpose the circuitry is equipped with a device for the formation and procession of a compensating factor which stores the measuring signals determined operationally of a greater number of measuring cycles and the output signals of which are compared with the reference value and then fed either to the support value register for adaptation of the support value or to the impulse generator for changing the impulse ratio.

If the compensating factor is changed by a predetermined value then the support value will be adapted by enlarging or reducing and/or the blending ratio from the normal differential value and the support value will be changed accordingly. The object of this invention is shown in the attached drawing in the form of three configuration examples; shown in:

DESCRIPTION OF PREFERRED EMBODIMENTS

Figure 1:
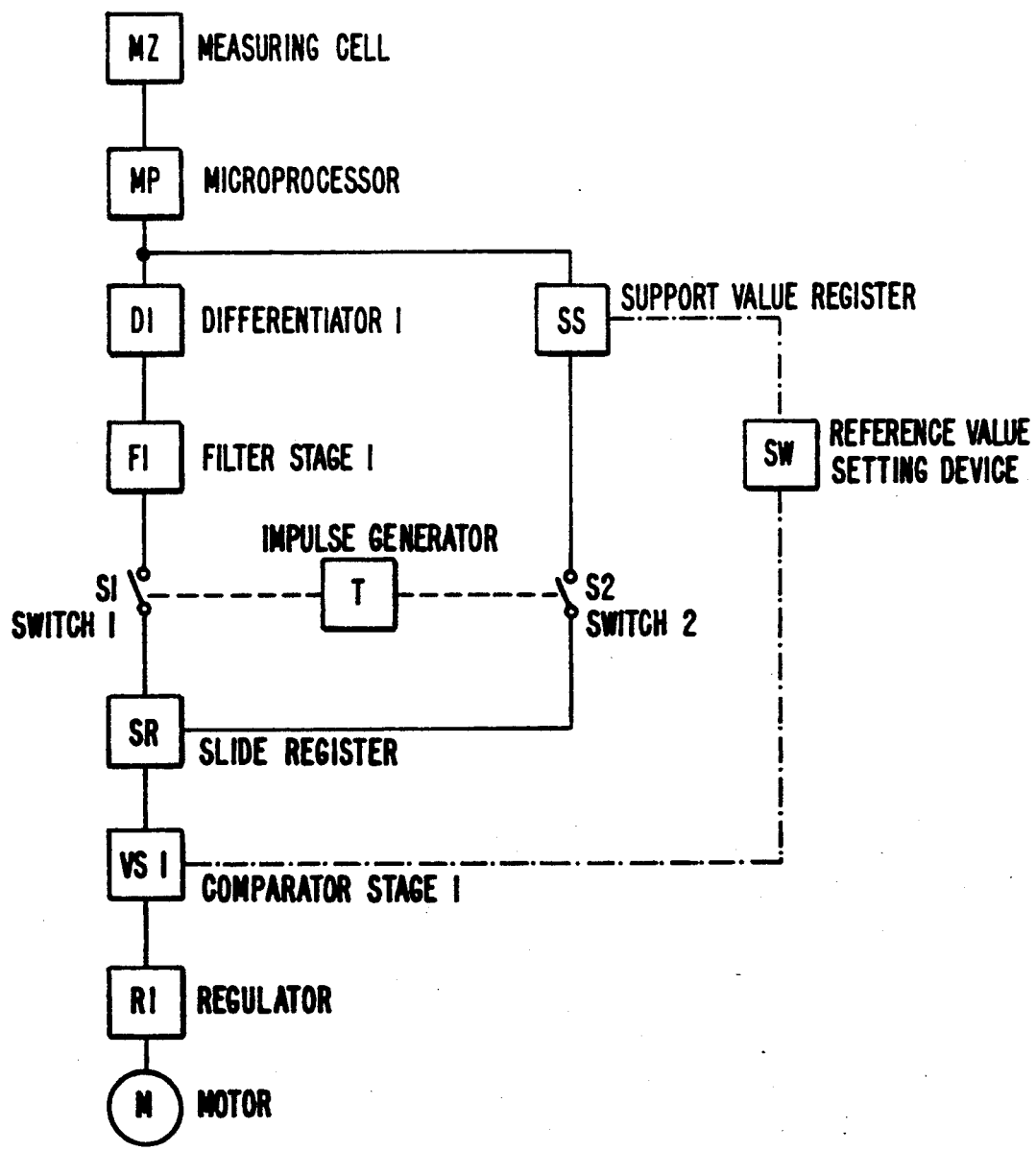
FIG. 1 is an electronic circuitry in a wiring diagram for a weigh feeding device with an additional circuit for the formation of a support value.

The electronic circuitry shown in FIG. 1 serves to regulate and control the discharging device of a weigh feeding apparatus for pourable substances such as granulates, powders and fluids. The weigh feeding device not shown in the drawing consists in the known manner of a container equipped with a controllable discharging device. Two weighing systems are known. In the one the container and the controllable discharging device associated to it are arranged on a weighing device which produces measuring signals proportional to the loss of weight. In another configuration the container may be arranged stationary together with the associated controllable discharging device and the discharging device feeds the material onto a subsequent conveyor, e.g. a belt feeder or a similar device which is arranged on a scale. The electronic circuitry is equipped with a computer. In the first mentioned configuration the loss of weight of the unit consisting of the discharging device and the container is determined, and in the other configuration a change in weight on the conveyor is determined. In both cases the weighing device has an electronic measuring device or cell MZ which forms digital measuring signals proportional to the change in weight and then stores them.

Thereby it is possible that at first analog measuring signals are formed which then are converted by an analog-digital converter into digital measuring signals. There are also measuring cells, however, which immediately produce digital measuring signals.

The measuring signals stored in the measuring cell MZ are digital and are called up cyclically by a microprocessor MP. This micro-processor MP is designed so that it will form a numerical value proportional to the change in weight by means of filtration, serial transformation, e.g. a slide register, and by formation of a mean value. In the regular controlling circuit the numerical value is fed into a differentiating device D1 which then forms a differential value from the two values put in last. This differential value is then fed via a filter step F1 which limits the differential value to a predetermined frequency range which is fixedly set on configuration 1. The limited differential value is then fed to a slide register SR via a switch F1 the function of which is described in detail below. From this slide register SR the signal then is fed to a comparator stage VS1 which compares the differential value with a reference value put in from a reference value adjuster SW. The reference value of the comparator stage VS1 is then fed to a regulator R1 which forms the set value for the drive motor M of the conveyor. This controlling circuit serves for the normal regulation of the weigh feeding apparatus.

The numerical value proportional to the weight change produced by the microprocessor MP is further fed to a support value register SS which forms supporting values out of the numerical values obtained from an adjusting operation free from external disturbances. For this adjusting operation the weigh feeding apparatus is operated completely at a disturbance-free site. There the container is filled and the weigh feeder is operated. The numerical values of the microprocessor MP resulting from this which are proportional to the loss of weight are then fed into the support value register. Here they are compared with the reference value.

If a loss-in-weight feeder is involved then the various supporting values for different feed speeds will be calculated. After that the weigh feeding apparatus is erected at the site and may be put into operation. The support values remain stored in the support value register SS and may be called up as required. This is done by means of switch S2 which is operated together with switch S1 by an impulse generator T. This impulse generator feeds the differential values of filter stage F1 and the support values of support value register SS to a slide register SR via switch S1 and S2. Slide register SR stores both the differential values and support values and blends them in the ratio controlled by the impulse generator. The blended or mixed value so formed is an adapted differential value in which the adapted support value portion acts towards the formation of a mean value. The blended value is then fed into comparator stage VS1 which uses the controlling value by comparing the blended values with a reference value. This controlling value is then used in regulator R1 to produce the control value for the drive motor M of the conveyor: The impulse generator T may be set to a different impulse ratio so that varying signal quantities may be fed to the slide register SR via switches S1 and S2 resp. The components mentioned above are parts of an electronic computer.

Figure 2:
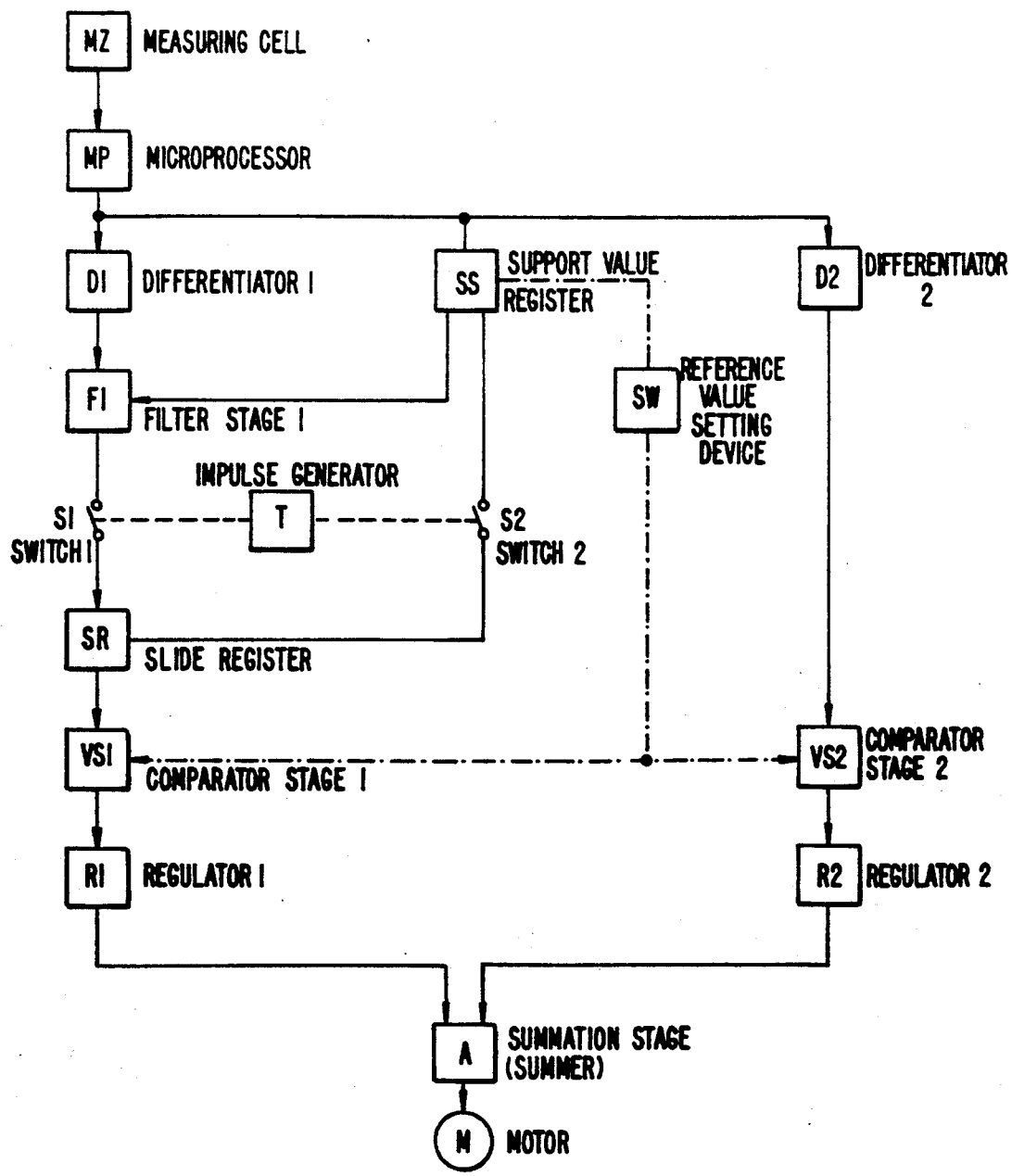
FIG. 2 is the object of FIG. 1 with an additional circuit for the formation of an additional compensating factor.

In the configuration shown in FIG. 2 an additional circuit has been provided which permits a long-term correction. This additional circuit consists of a differentiator D2 which receives the numerical values from the micro-processor MP and stores them in long-term cycles. It forms the differential value from the two values put in last. This differential value of the differentiator D2 varies from the differential value of the differentiator D1 by the time of the detection of the measuring value only. Normally the differentiator D2 is designed in such a way that the detecting cycles are approximately ten times larger than those of differentiator D1.

The differential values of the differentiator D2 are fed to a comparator stage VS2 the comparing value of which may be used in various ways.

In the configuration shown in FIG. 2 it is used as a control or set value for a regulator R2. The control or set value so produced is then fed together with the control values coming from the regulator R1 to a summation stage or summer A which then produces a blended set value for the motor drive M in the discharging device.

Figure 3:
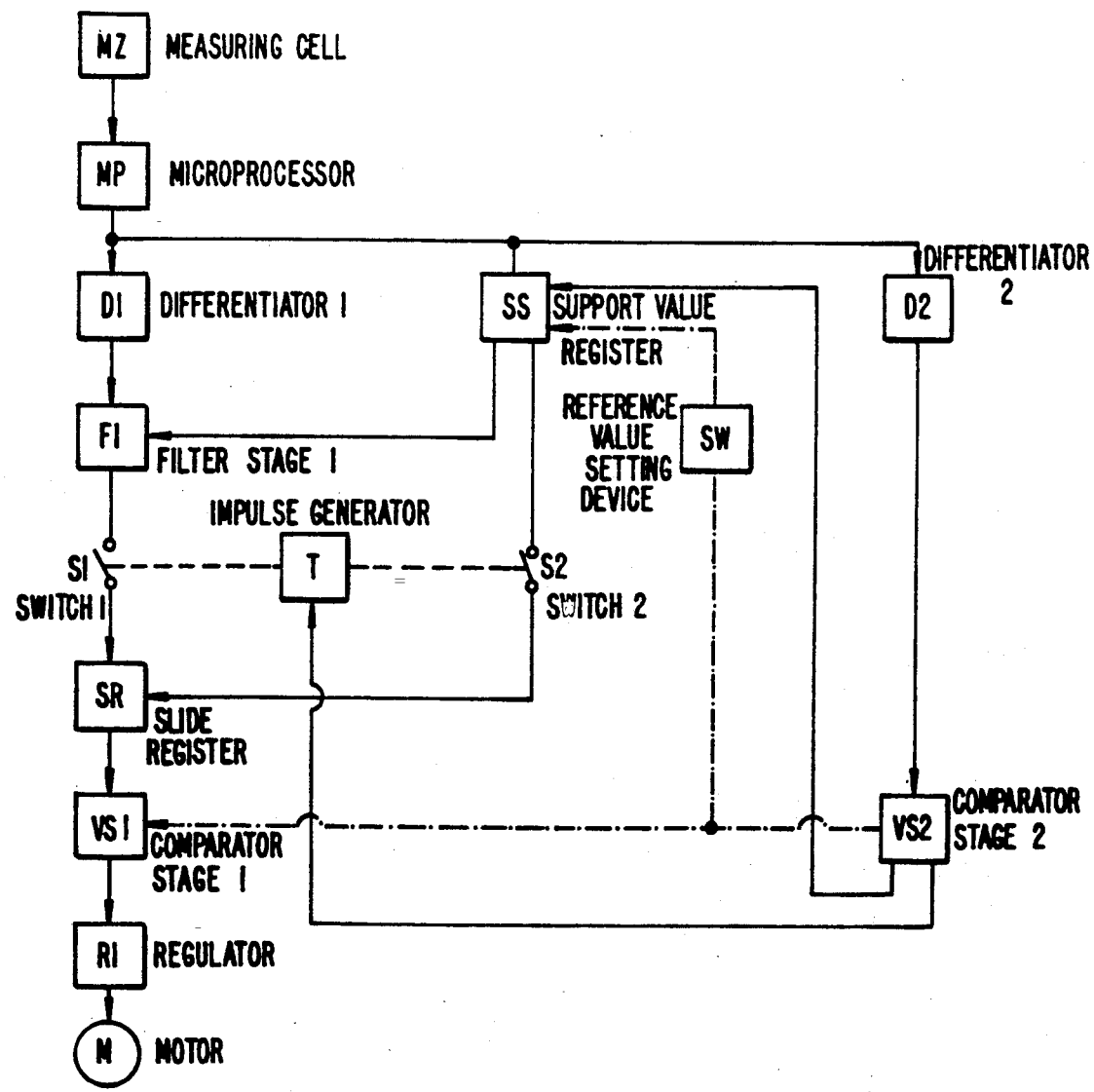
FIG. 3 is the object of FIG. 2 with an additional circuit for the formation of a compensating factor for controlling purposes.

In the configuration shown in FIG. 3 the comparative values of comparator stage VS 2 are used for control purposes. On the one hand these comparative values serve as control values for the adaptation of the support value by being fed to the support value register SS. Furthermore a control of the impulse ratio is provided in FIG. 3. For this purpose the comparative value is fed to the impulse generator T. Both steps may be provided individually or jointly.

The configurations shown in FIGS. 1 to 3 may be changed in such a way that one impulse generator is set into operation by the occurrence of extremely high measuring signals.

What is claimed is:

1. A weigh feeding apparatus for pourable substances such as granulates, powders and fluids, comprising a container equipped with a controllable discharging device, a weighing device for the container discharging the substance or for a conveyor receiving the substances and an electronic circuitry supplied with a computer for the regulation and control of the discharging device, which counts digital measuring signals of the weighing device during a period of time, compares them with a reference signal and produces a setting or control value for the discharging device, characterized in that the circuitry contains a device for the formation and procession of a support vale prior to the operation of the weigh feeder by storing the measuring signals at one or several conveying speeds of the discharging device, converts these signals to the setting range, adds the support values to the measuring signals produced at the operation during the occurrence of extremely high measuring signals or temporarily by means of an impulse generator and compares the mixed values with the reference value and produces the setting or control values for the discharging device at a divergence of the signal.

2. A weigh feeding apparatus as in claim 1, characterized by the fact that the measuring signals determined in operation and the support values are fed into a slide register (SR) in a ratio set and controlled at the impulse generator (T).

3. A weigh feeding apparatus as in claim 1 characterized by the fact that the measuring signals determined in operation are fed through a filter (F) the frequency range of which may be fixed or controlled dynamically by the support values.

4. A weigh feeding apparatus corresponding to claim 1 characterized by the fact that the circuitry is provided with a device producing and processing a compensating factor which stores the measuring signals of a greater number of measuring cycles determined in operation and forms a correction value by comparing those signals with a reference value, this correction value then being added to the control value by means of a summation stage or summer.

5. A weigh feeding apparatus corresponding to claim 1, characterized by the fact that the circuitry is provided with a device producing and processing a compensating value which stores the measuring signals of a greater number of measuring cycles determined in operation and the output signals of which are compared with a reference value and then are fed to the support register (SS) for adaptation of the support value and/or to the impulse generator (T) for changing the impulse ratio.

6. A weigh feeding apparatus for pourable materials controlled by an operator comprising:
    a container including a discharging device having a means for controllably discharging the material at at least one discharge rate setting, the discharging means being adapted to be controlled by a control signal;
    a weighing device for determining the weight of the material discharged from the discharging device during a period of time;
    the weighing device having a means for producing digital signals proportional to the weight of the substances discharged during said period of time when the weighing device determines the weight;
    means for storing a support value for at least one discharge rate setting received from the digital signal producing means of the weighing device and previously generated by the digital signal producing means during operation of the weigh feeding apparatus in an environment free of external weight measurement influencing disturbances;
    means including an impulse generator for generating a resulted blended signal configured to receive and blend the support value and the digital vale signal in a predetermined ratio;
    a reference value adjustable setable by an operator for generating a reference value;
    comparing means for comparing the blended signal with the reference vale and producing a corresponding comparison signal; and
    a regulator coupled to the comparing means for generating the control signal from the comparison signal and for transmitting the control signal to the discharging device for controlling the discharge means.

7. The weigh feeding apparatus of claim 6 wherein the weighing device weighs a conveyor receiving the substance discharged from the discharge device.

8. The weigh feeding apparatus of claim 6 wherein the weighing device weighs the container.

9. The weigh feeding apparatus of claim 6 wherein the means for generating the blended signal comprises a slide register.

10. The weigh feeding apparatus of claim 6 including a filter with a frequency range, and wherein the digital signals are fed through the filter, the frequency range being wither fixed or dynamically controlled by the support value.

* * * * *